Figure 1:
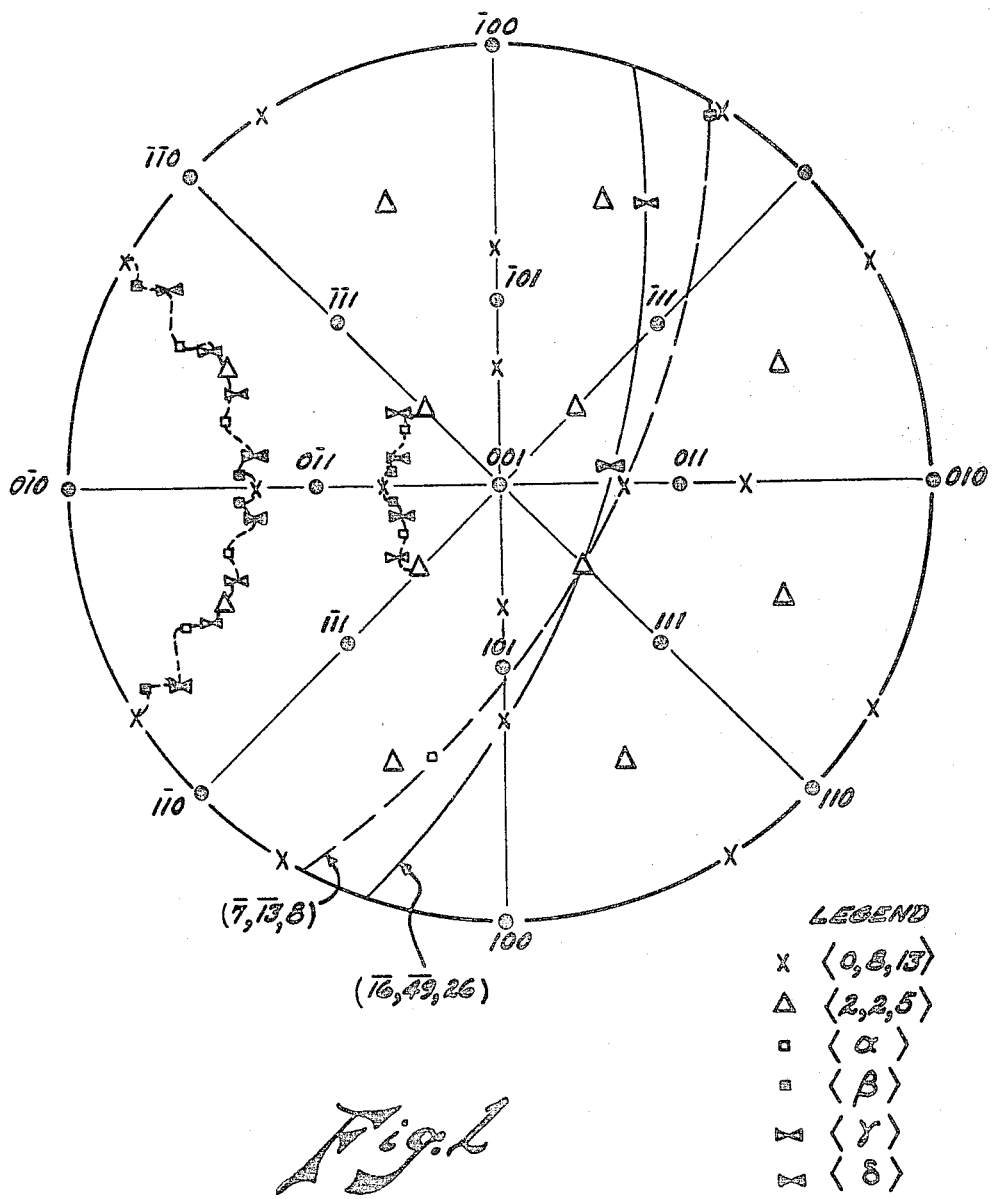

3,409,823
**METHOD OF ELIMINATING MAGNETOCRYSTAL-
LINE ANISTROPY EFFECT ON SPIN RESONANCE
OF FERRIMAGNETIC MATERIALS**
Ernst R. Czerlinsky, Arlington, and Peter D. Gianino, Melrose, Mass., assignors to the United States of America as represented by the Secretary of the United States Air Force
Filed July 1, 1966, Ser. No. 563,338
2 Claims. (Cl. 324—.5)

The invention described herein may be manufactured and used by or for the United States Government for governmental purposes without payment to us of any royalty thereon.

This invention relates to the magnetocrystalline anisotropy energy of ferromagnetic materials such as ferrite and garnets. More particularly, the invention relates to a method of eliminating the effect of anisotropy and concomitant temperature influence on the resonance field of single crystals of yttrium iron garnet and related materials.

Magnetocrystalline anisotropy is a fundamental property of all ferro- and ferri-magnetic solids; it significantly affects all magnetization processes. The derivatives of anisotropy energy with respect to the angles of the magnetization vector in the crystalline lattice describe the torques exerted on the spins within the magnetic structure. In addition, the spins also experience directing forces resulting from external fields. Therefore, the magnitude of the external DC fields, $H_{ext}$, required to obtain resonance at a particular angular position of the saturation magnetization vector depends in general on the magnitude and shape of the anisotropy energy surface at that position. This resonance field also depends on temperature.

Heretofore, it was found that the effect of the anisotropy on the resonance vanishes in yttrium iron garnet, YIG, if the field is directed along a direction approximately 29.7° off the $<100>$ direction in the $\{110\}$ plane, the Miller indices for this direction being $<225>$. Throughout this application, the convention that $<\ >$ and $\{\ \}$ signify crystallographically equivalent directions and planes, respectively, is used. The singular behavior referred to above has been utilized in design of microwave devices that take advantage of the sharpness of the resonance line occurring in YIG and related materials. If $H_{ext}$ coincides with this particular direction, then its magnitude remains unchanged with temperature. It is obvious that such a singular direction has to occur in the $\{110\}$, because this plane contains both the easy and hard directions for magnetization. In the former direction, $<111>$ for YIG, the anisotropy torque is added to the torque produced by the external field, whereas in the latter, namely $<100>$ it is subtracted from the action of $H_{ext}$. There has to be a position between the two extrema at which the magnetization vector precesses without sensing the presence of the anisotropy.

Accordingly, it is an object of the invention to provide an arrangement wherein there exists crystalline directions other than $<225>$ in which the anisotropy does not affect the resonance.

Another object of the invention is to provide a continuous multiplicity of directions which exhibit the singular behavior wherein the effect of the anisotropy on the resonance vanishes in YIG.

Still another object of the invention is to provide certain crystallographic planes wherein angular deviations in $H_{ext}$ from a singular direction are of minor consequence with respect to the anisotropy effect on the resonance. In particular, the invention provides that deviations of at least $\pm 5°$ from the $<225>$ in the $\{554\}$ plane, or in planes tilted a few degrees from the $\{554\}$ do not destroy this singular behavior.

These and other objects, features and advantages will become more apparent after considering the following detailed description taken in conjunction with the annexed drawings and appended claims.

Figure 2:
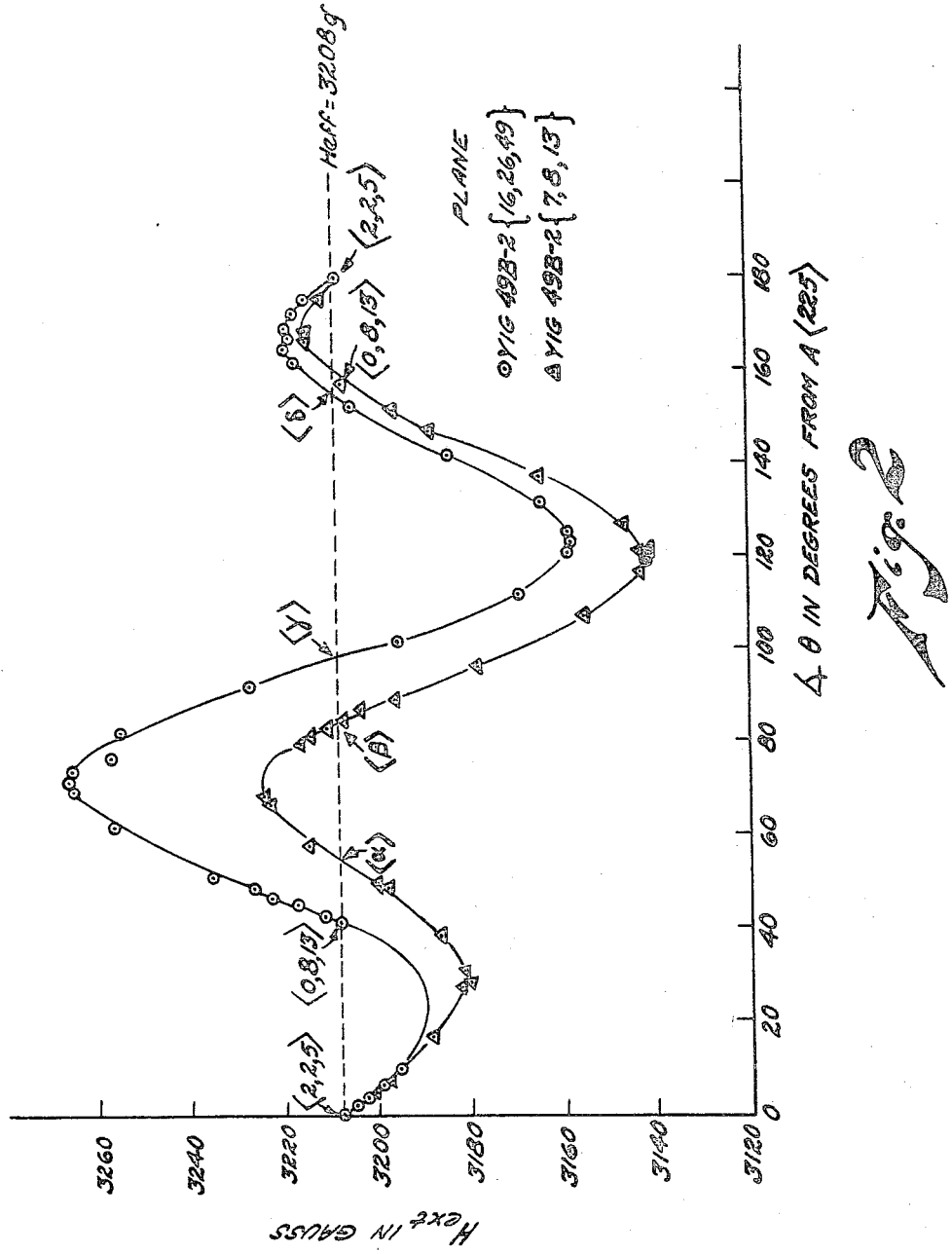
Figure 3:
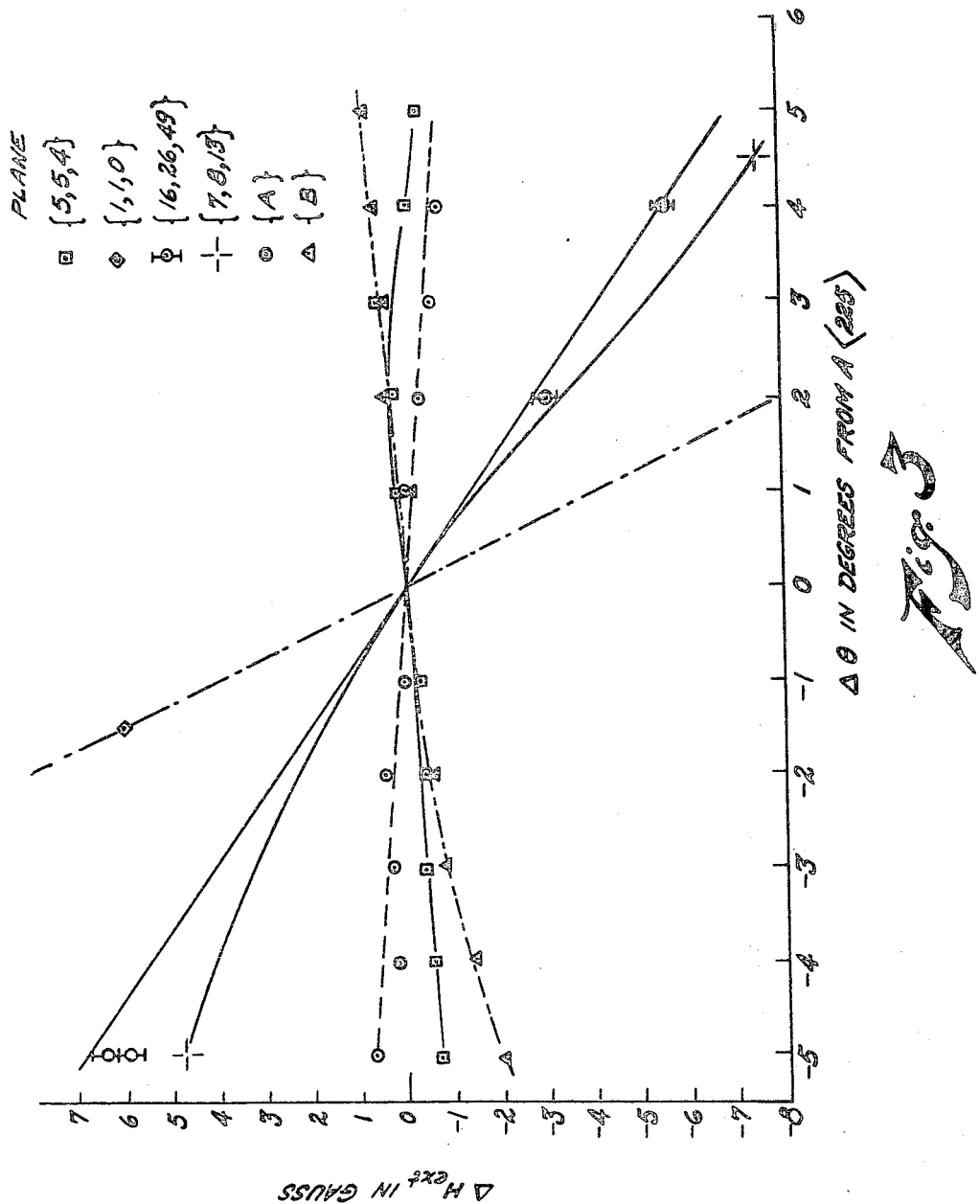

In the drawings:
FIGURE 1 is a standard (001) projection with singular directions and a singular curve;
FIGURE 2 is a graph showing the resonance field in two selected planes; and
FIGURE 3 is a graph showing the change of resonance field with misalignment.

The anisotropy energy is described by periodic functions of the angles which the saturation magnetization forms with the edges of the crystalline lattice. Hence, the energy surface, as well as the angular derivatives of the energy, is continuous. Consequently, a continuous multiplicity of singular directions is to be anticipated, which also reflects the symmetry properties of the lattice. In order to establish this multiplicity, resonance measurements were performed in different planes.

The field required for resonance was measured at different positions of the field within each plane over a range of 180°. From a plot of these measurements, the singular directions, occurring whenever $H_{ext}$ equals $\omega/\gamma$ identified as $H_{eff}$, are determined. These concepts are described below along with concurrent mathematical details. In the $\{110\}$, two more singular directions were found symmetrically located about the $<110>$. The Miller indices are $<0, 8, 13>$.

From the many singular directions that are equivalent to the foregoing, the three closest-lying ones have been used to define two new planes, each containing a $<225>$ and one of the $<0, 8, 13>$. FIGURE 1, an (001) cubic standard projection, shows the position of these two planes, designated by $\{7, 18, 13\}$ and $\{16, 26, 49\}$. FIGURE 2 contains the plots of $H_{ext}$ versus angle over a 180° excursion for these two planes. In each, two more singular directions are found labeled by the Greek letters, $\alpha$ and $\beta$ and $Y$ and $\delta$.

All known singular directions as designated in the legend of FIGURE 1 are depicted on the stereographic net. By performing the suitable symmetry operations, the directions within one quarter of the net have been assembled to approximate contour segments of singular directions of YIG. Symmetry would complete the contours herein called "singular curves." Each singular curve circumscribes a $<100>$ and the multiplicity of "singular directions" form a cone-like surface about each $<100>$.

The significance of the singular curve is now considered with special reference to the design of microwave devices. Each direction determined by the singular curve corresponds to a condition under which the anisotropy effect on the resonance vanishes, inclusive of large changes in temperature and pressure. The existence of this singular curve implies that a misalignment of $H_{ext}$ is most detrimental if it occurs in planes perpendicular to the curve as in $\{110\}$. In this plane, resonance experiments prove that if $H_{ext}$ deviates from a $<225>$ by as little as 1°, a change in $H_{ext}$ of 4 g. would be required to restore resonance at room temperature. Such a shift is quite serious when dealing with materials whose linewidths are usually less than a few gauss; this is to be expected when considering that the $\{110\}$ is the only plane containing both the easy and hard directions of magnetization and that the $<225>$ lies approximately midway on the steep slope between them. Furthermore, the magnitude of this required change (and therefore the slope) would increase at the lower temperatures. Thus, the usefulness of singular directions would be handicapped by the demand for a very accurate crystal orientation. Yet, an orientation of less than 1° error is extremely difficult to achieve with the small samples (spheres of diameter 1 mm. or less)

employed in devices. Even when the sample is preoriented by presently used methods such as the Laue X-ray procedure, a misalignment of a few degrees between singular direction and external field is to be expected after transfer of the crystal from an X-ray goniometer to the device structure. The present invention provides that the stringent requirements of a highly accurate orientation which was heretofore necessary can now be alleviated by utilizing planes tangential to the singular curve.

A YIG sample was oriented in an X-band cavity of a standard ferrimagnetic spectrometer such that the rotational axis of the sample post, the external field, and a <225> were all aligned parallel. With this configuration, the sample could then be rotated about the <225> as an axis. As each plane belonging to the <225> zone came into coincidence with the plane in which $H_{ext}$ was constrained to rotate, resonance as a function of angular deviation from the <225> was investigated on both sides of the <225>. A sufficiently wide range of angles was examined to establish definite results about the slopes for six planes of the <225> zone.

FIGURE 3 summarizes the results of these measurements. The ordinate is the change in external field in gauss measured relative to $H_{eff}$ (which is 3208 g.). The abscissa represents the angular distance in each plane relative to the <225>. A perfect {554} orientation, which is the plane tangential to the singular curve and orthogonal to the {110} at a <225> position, should yield a resonance curve (i.e., $H_{ext}$ vs. angle) symmetrical about the <225>. Our measurements on a slightly misoriented sample show an almost symmetrical resonance curve of practically zero slope with ½ g. variation, at most, for approximately ±5°. This same slope is maintained out to roughly ±10°. For comparison of slopes, the pertinent portions of the {110}, {16, 26, 49}, {7, 8, 13}, {A} and {B} resonance curves, all belonging to the <225> zone, have been included in FIGURE 3. The planes designated by {A} and {B} are tilted ±3° with respect to the {554}. Even in these planes the anisotropy effect is rather small.

The equation governing ferrimagnetic resonance is given in its simplest form by $$\omega/\gamma = H_{eff} \quad (1)$$

where $\omega/2\pi$ is both the operating frequency of the device and the precessional frequency of the magnetization vector (M), $H_{eff}$ the "effective," or net resultant field within the magnetic medium, and $\gamma$ the magnetogyric ratio. Since $\omega$ is fixed by experimental design and $\gamma$ by nature, $H_{eff}$ must always remain constant to maintain resonance. However, there are two principal contributors to $H_{eff}$ in spherical samples, $H_{ext}$ and the anisotropy field ($H_{anis}$). $H_{anis}$ is a function of orientation as well as of anisotropy constants. To a first-order approximation it is of the form $$H_{anis} = (K_1/M) f(\theta) \quad (2)$$

where $K_1$ and $M$ are, respectively, the temperature-dependent anisotropy constant and magnetization, $\theta$ the angle between the external field and any arbitrary crystallographic reference direction in the plane of interest, and $f(\theta)$ a trigonometric function. In order to compensate for variations in $H_{anis}$ with direction angle and thereby preserve resonance, the magnitude of $H_{ext}$ must also change with $\theta$. In terms of these two fields the resonance equation is $$H_{eff}^2 = (\omega/\gamma)^2 = [H_{ext} + (K_1/M) f_1(\theta)] \times [H_{ext} + (K_1/M) f_2(\theta)] \quad (3)$$

The two $f$ functions are related to the torques exerted by the anisotropy in two perpendicular directions at the position $\theta$. The ratio of $H_{ext}$ to $K_1/M$ is greater than 10 for YIG at all temperatures. Under this condition, Equation 3 is approximated by $$H_{eff}^2 = H_{ext}^2 + H_{ext}(K_1/M)[f_1(\theta) + f_2(\theta)] \quad (4)$$

If, at some singular direction ($\theta_s$), $$f_1 = -f_2 \quad (5)$$

then $$H_{eff} = \omega/\gamma = H_{ext} \quad (6)$$

and the resonance condition is freed from the temperature-dependent $K_1/M$ term. Anisotropy is still present, but under these circumstances its action upon the resonance vanishes.

In the linear approximation, others have solved Equation 5 for the {110} plane and obtained the <225>. Under the same restrictions, we find that anisotropy effects also vanish in the {100} plane. For this plane $$f_1(\theta) = 2 \cos 4(\theta) \quad (7)$$

$$f_2(\theta) = \tfrac{3}{2} + \tfrac{1}{2} \cos 4(\theta) \quad (8)$$

from which $\theta_s$ is 31.7° and 58.3° from a <100>, i.e., the two equivalent <0, 8, 13> directions.

The seriousness of slight misorientations in those planes perpendicular to the singular curve becomes evident. For example, suppose that the resonance has been initiated at 1° off the <225> in the {110}. Then, for a temperature change of −30° K., it can be shown that the resonant field value changes by 5 g. This means that the present external field would now be off resonance by this amount. As a result, resonance would be completely lost in narrow linewidth samples. However, in the {554} plane which is orthogonal to the {110} and tangential to the singular curve, such changes of $\theta$ and T would have no effect on the resonance. This is evidenced by the following considerations: The singular curve describes all directions for which $F(\theta) = 0$. Therefore, in any plane tangenital to the singular curve, the deviations of F from this constant value are negligible for moderate $\Delta\theta$ and $dF(\theta)/d\theta = 0$ on both sides of $\theta_s$.

Utilization of the singular curve and planes tangent to it provides an accurate method for the elimination of the effect of anisotropy and the concomitant temperature influence on the resonance field of single crystals of YIG and related materials. Such conditions certainly apply to indium-substituted YIG over all temperatures. They also apply to gallium-substituted YIG whose gallium content ($x$) is less than or equal to 1.154 in the unit formula $Y_3Fe_{5-x}Ga_xO_{12}$ for temperatures no lower than approximately 200° K. This lower limit was determined for the $x=1.154$ case to assure that the ratio of $H_{ext}$ to $K_1/M$ be greater than 10. Such ratios will hold for external fields of approximately 3000 g. when the temperature is greater than 200° K. so that $K_1/M$ will be less than 300 g.

It is practically no more difficult to orient the sample in, e.g., a <225>–{554} configuration rather than a more conventional orientation with the X-ray method, even though the {554} does not produce a trace of diffraction points. The {554} occurs as often as the {110} and its presentation on the film can easily be derived from the recognizable traces of the planes with lower indices by using the Greninger chart.

It should be understood that the foregoing is illustrative of the principles of the invention and that various other arrangements based on these principles may be devised by those skilled in the art without departing from the true spirit and scope of the invention as defined in the appended claims.

What we claim is:

1. The method of eliminating the effect of magnetocrystalline anisotropy and concomitant temperature influence on the resonance field of single crystals of ferrimagnetic and ferromagnetic materials comprising the steps of; providing a sample of said material located in a device whereby said sample is immersed in a unidirectional external magnetic biasing field, $H_{ext}$, and exposed to an alternating magnetic field having an operating frequency, $f$, orienting a sample of the material in said device in such said manner that the external biasing field, $H_{ext}$, lies along any one of a continuous multiplicity of singular directions forming a conelike surface about each <100>, and adjusting both the operating frequency of the device and the strength of $H_{ext}$ to satisfy the mathematical relationship $f=(\gamma/2\pi)H$, where $\gamma$ is the magnetogyric ratio.

2. The method of eliminating magnetocrystalline anisotropy defined in claim 1 wherein the plane which contains angular deviations of $H_{ext}$ up to 5° from one of the singular directions lies parallel to the cone-like surface.

References Cited

UNITED STATES PATENTS

| 3,246,263 | 4/1966 | Clark | 333—241 |
| 3,087,122 | 4/1963 | Rowen | 324—0.5 |

RUDOLPH V. ROLINEC, *Primary Examiner.*

M. J. LYNCH, *Assistant Examiner.*